Aug. 18, 1970  P. T. HARFORD  3,524,656
STEERING CONTROLS FOR MOTOR VEHICLES
Filed Oct. 23, 1968  5 Sheets-Sheet 5

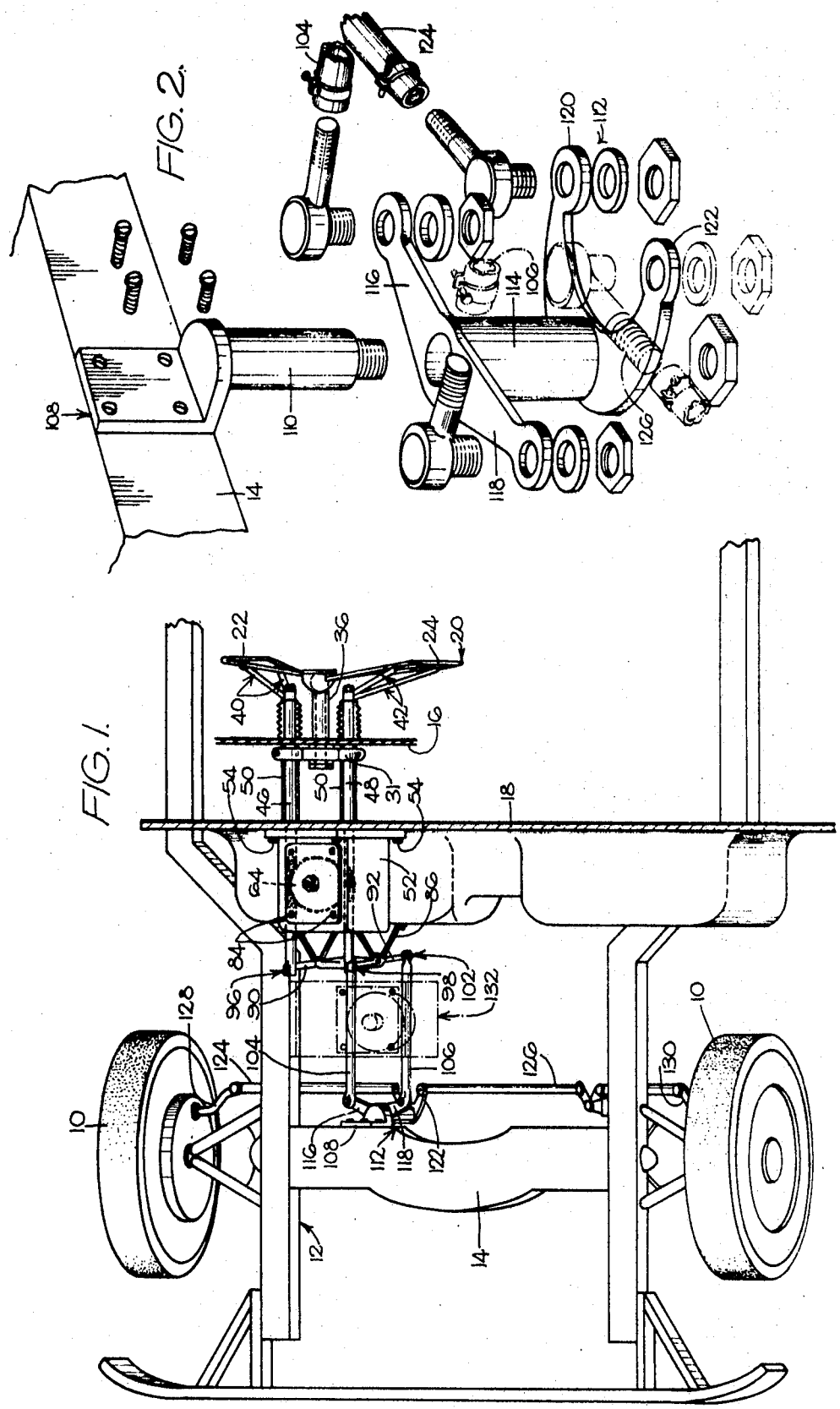

Inventor
Patrick T. Harford
By Lucke & Lucke

United States Patent Office 3,524,656
Patented Aug. 18, 1970

3,524,656
STEERING CONTROLS FOR MOTOR VEHICLES
Patrick T. Harford, P.O. Box 1460, Port Elizabeth,
Cape Province, Republic of South Africa
Filed Oct. 23, 1968, Ser. No. 769,863
Int. Cl. B62d *1/02*
U.S. Cl. 280—87                                15 Claims

ABSTRACT OF THE DISCLOSURE

A steering control for a motor vehicle having a reversing movement coupling between the manually movable control means such as a handlebar and steering means connectable to the steerable road wheels of the vehicle to cause the control means to move forwardly away from the driver if the steering means is forced rearwardly of the vehicle as a result of a collision.

SUMMARY OF THE INVENTION

According to the present invention there is provided a steering control for a motor vehicle comprising manually movable control means for connection to a steerable road wheel or wheels of the vehicle wherein the improvement comprises a reversing movement coupling operative in a direction forwardly and rearwardly of the vehicle and connected to the manually movable control means and to steering means connectable to the steerable road wheel or wheels of the vehicle whereby if the front of the vehicle is involved in a collision and the steering means is forced rearwardly of the vehicle, the manually movable control means is urged forwardly of the vehicle and thus away from the driver so that injury to the driver as a result of the collision is avoided or lessened.

BRIEF DESCRIPTION OF THE DRAWINGS

A steering control according to the present invention and as applied to a motor vehicle will now be more particularly described by way of example with reference to the accompanying drawings in which FIG. 1 is a part-sectional diagrammatic perspective view of a part of a motor vehicle with parts thereof removed for clarity, FIG. 2 is an exploded perspective view of a relay cluster between steering means and the front wheels of the vehicle and on an enlarged scale.

DESCRIPTION OF THE PREFERRED EMBODIMENT

Figure 3:
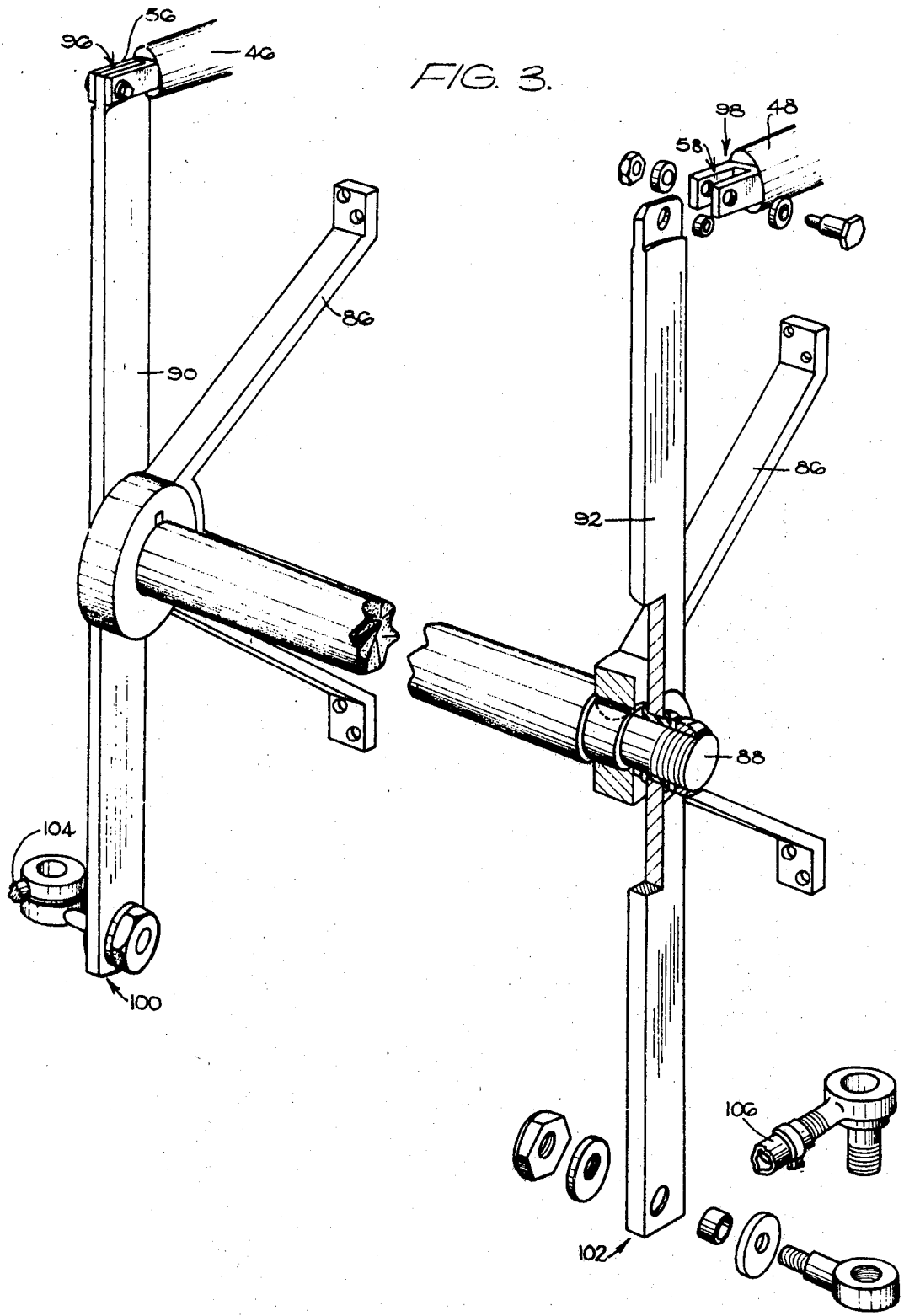
FIG. 3 is an exploded perspective view of the reversing movement coupling on an enlarged scale.

For convenience similar reference numerals will be used where possible to denote corresponding parts throughout the several views.

The vehicle with the exception of the steering control is a conventional road vehicle having four road wheels of which only the two front steerable wheels 10 are shown these being mounted in any convenient manner on a chassis or body generally indicated at 12 and which includes a front transverse beam 14. Supported by the chassis 12 is a dash panel 16 and a bulk-head panel 18.

A manually movable control means 20 is provided which is employed instead of a conventional steering wheel and occupies a position normally occupied by the steering wheel so that the control means 20 is disposed at approximately the same level as the chest of the driver of the vehicle.

Figure 5:
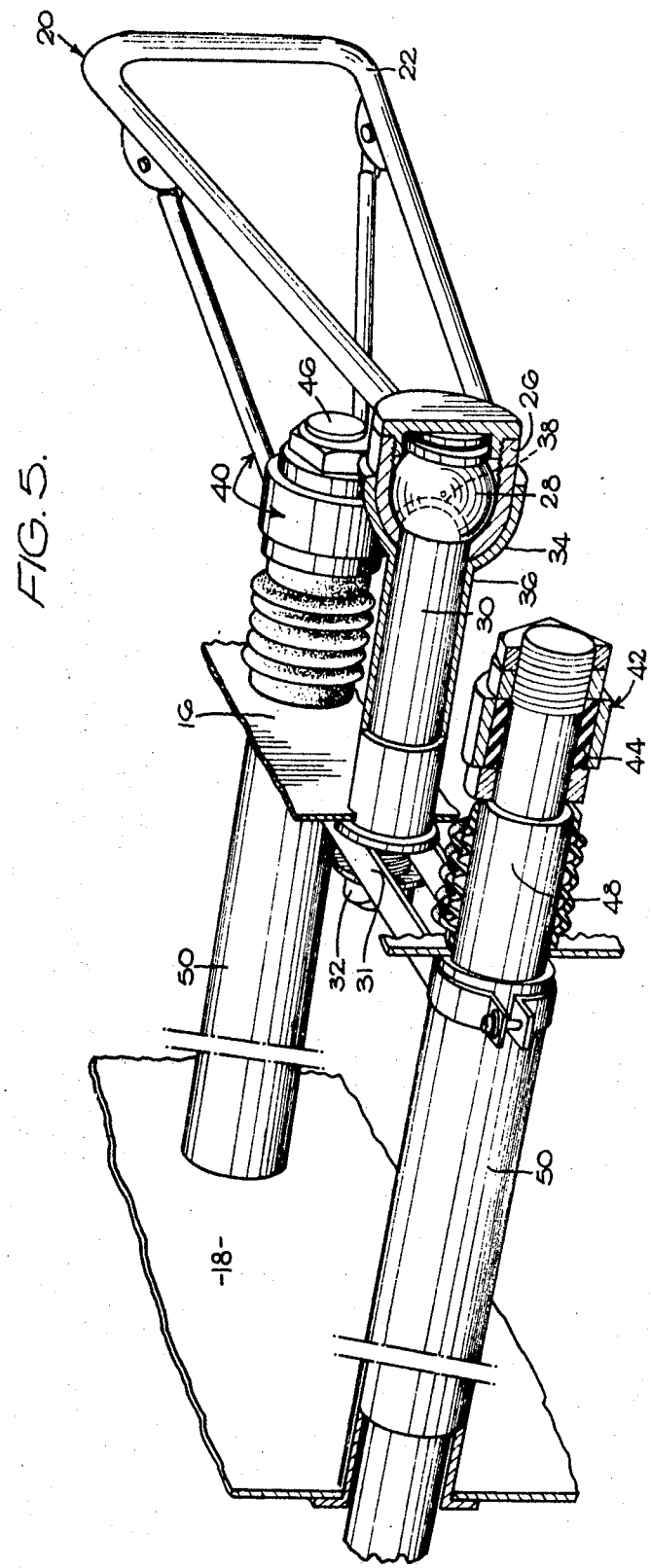
FIG. 5 is a sectional perspective view of the manually movable control means on an enlarged scale.

The control means 20, see FIG. 5, is arranged to be operative somewhat in the manner of a handlebar control and comprises a lever having right-hand and left-hand members 22 and 24 respectively and this lever is provided centrally of said members with a ball socket 26 mounted on the ball head member 28 secured to a stationary rod 30 extending forwardly through the dash panel 16 and secured to a transverse clip 31 by screw means 32. The ball socket is mounted in a cup 34 from which forwardly extends a sleeve 36 surrounding the rod 30 and the forward end is supported against the clip 31 with, however, a washer therebetween. Formed in the ball socket 26 is a horizontally elongated slot 38 to accommodate the rod 30 and this enables the members 22 and 24 to be simultaneously moved respectively forwardly and rearwardly and vice-versa of the vehicle to steer the vehicle.

The members 22 and 24 have pivotally connected thereto adjacent their outer ends links 40 and 42 respectively which are pivotally connected through rubber bushes 44 at their inner ends to right and left-hand control shafts 46 and 48 respectively said control shafts being slidable longitudinally and being disposed in a horizontal plane extending through the centre of the stationary rod 30 and on opposite sides thereof and being supported by suitable stationary sleeve bearings 50 disposed longitudinally of the vehicle and mounted in the bulk-head panel 18 and the clip 31. Conveniently the axes of the control shafts 46 and 48 are disposed horizontally. Thus when the control means 20 is rocked about a vertical axis in the nature of a handle-bar control one control shaft is moved forwardly whilst the other control shaft is simultaneously moved rearwardly and said shafts move equal distances.

The forward ends of the control shafts 46 and 48 enter a gear or synchronising box 52 mounted on the front of the bulk-head 18 and secured thereto by relatively light and thus easily fracturable bolts 54 which are, however, sufficiently strong to retain the synchronising box in position during normal steering operations and which bolts are only intended to fracture in the case of a collision and which will be referred to later.

The right-hand and left-hand control shafts 46 and 48 extend through the synchronising box and are supported in suitable bearings therein and their forward ends project forwardly beyond the forward end of the synchronising box 52 and are forked at 56, 58 respectively for a purpose to be hereinafter described.

Figure 4:
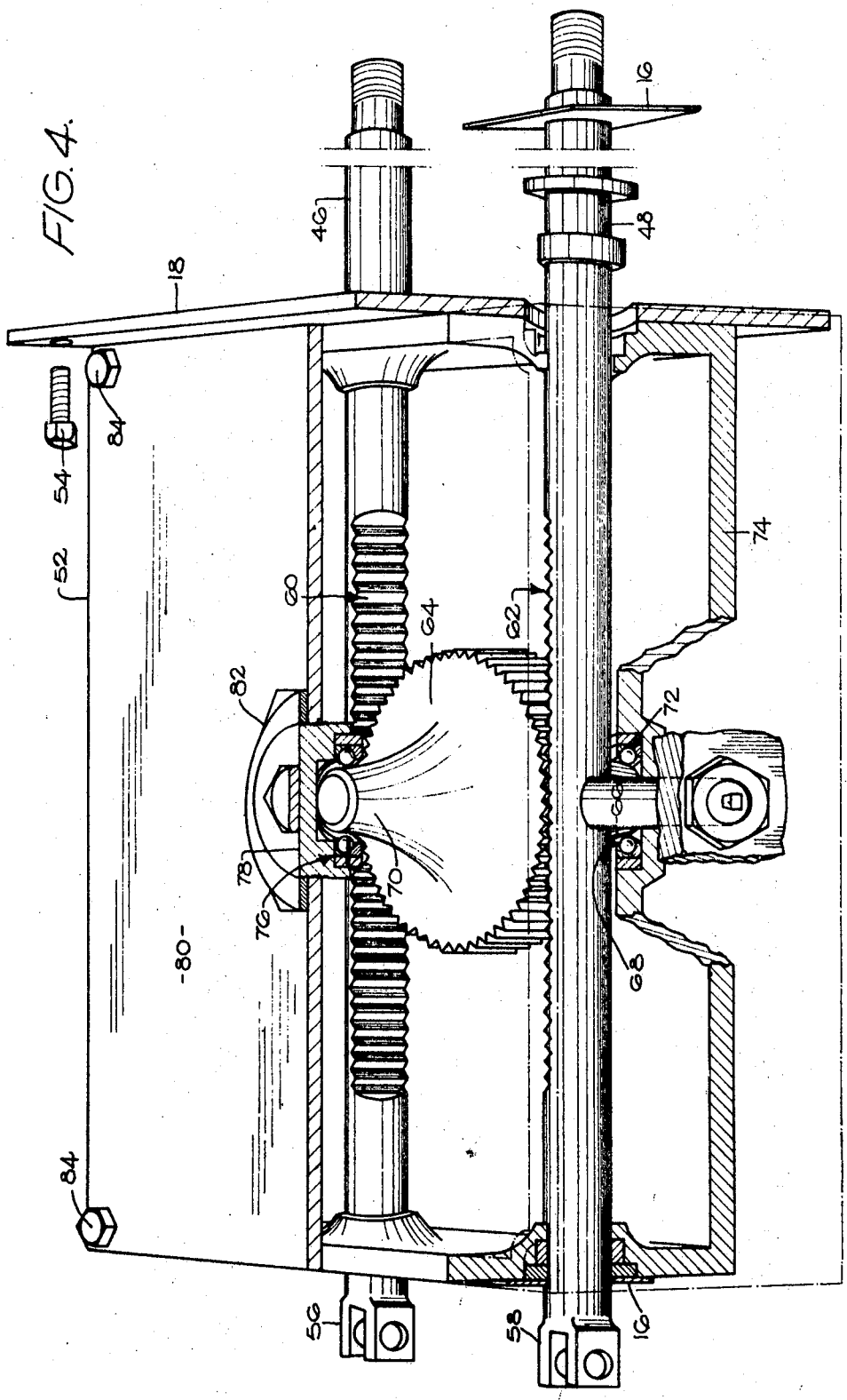
FIG. 4 is a sectional perspective view of a synchronising means on an enlarged scale.

The two control shafts 46 and 48 are formed with rack teeth 60, 62 respectively and these rack teeth mesh with a toothed pinion 64 at diametrically opposite positions thereof as shown in FIG. 4 and which is mounted in suitable bearings so as to be rotatable about a vertical axis so that the two control shafts are connected together by the toothed pinion and this ensures that the right-hand and left-hand control shafts move simultaneously in opposite senses. The two control shafts 46 and 48 are each supported by bearing pads so that their respective toothed racks maintain engagement with the toothed pinion 64 but only one of these bearing pads is shown at 66 and is supported by a side wall of the synchronising box 52.

The toothed pinion 64 has stub shafts 68 and 70 and the stud shaft 68 is supported in a ball race 72 supported in a recess in a base 74 of the synchronising box. The other stud shaft 70 is mounted in a ball race 76 located in a cup 78 which is screwed into a top plate 80 of the synchronising box and is locked in position by a lock nut 82 and this top plate 80 is secured to sides of the box by four easily fracturable bolts 84.

Secured to the front of the bulk-head 18 at a position below, not necessarily vertically below, the synchronising box 52 is a pair of supporting brackets 86 which is bolted to the bulk-head and mounted in the brackets is a shaft 88 which is horizontally disposed transversely of the vehicle and rockably mounted on the shaft 88 and thus about a horizontal transverse axis are two rockable levers there-being a right-hand lever 90 and a left-hand lever 92 and these levers are generally upright as shown in FIGS. 1 and 3. The levers are thus pivoted intermediate and preferably centrally between their upper and lower ends about the shaft 88 and the upper ends of the right-hand and left-hand levers 92 and 94 are respectively pivotally connected at 96 and 98 to the forward forked ends 56 and 58 of the control shafts 46 and 48 respectively.

The lower ends of the right and left-hand rockable levers 90 and 92 are respectively pivotally connected at 100 and 102 to the rear ends of right-hand and left-hand steering rods 104 and 106, see FIG. 1, which are substantially horizontally disposed.

Secured to the transverse beam 14 of the chassis 12 is a bracket member 108, see FIG. 2, which includes a vertically disposed hinge pin 110 on which is mounted a relay arm cluster 112 comprising a sleeve 114 rotatably mounted on the pin 110 and provided with right-hand and left-hand upper arms 116 and 118 respectively and right-hand and left-hand lower arms 120 and 122 respectively.

The right-hand and left-hand upper arms 116 and 118 are respectively pivotally connected to the forward ends of the right-hand and left-hand steering rods 104 and 106 and the lower right-hand and left-hand arms 120 and 122 are pivotally connected to the inner ends of aligned right-hand and left-hand rods 124 and 126, respectively. The outer ends of the two tie rods 124 and 126 are pivotally connected to steering arms 128 and 130 respectively connected to a known manner to the steerable right and left front wheels 10 of the vehicle.

The rockable levers 90 and 92 constitute a reversing movement coupling operative in a direction forwardly and rearwardly of the vehicle and the steering rods 104 and 106 constitute a steering means herein referred to.

In operation when the manually movable control means 20 is rocked about a vertical axis the appropriate forward and rearward movements of the members 22 and 24 are transmitted through the control shafts 46 and 48, synchronising box 52, rockable levers 90 and 92, steering rods 104 and 106, relay arms 116–122 and tie rods 124 and 126 to the steering arms 128 and 130 whereby the vehicle is steered as required.

In the case of the front of the vehicle being involved in a collision the steering rods 104 and 106 will both be pushed rearwardly of the vehicle whereby the rockable levers 90 and 92 will be rocked in a manner causing the control means 20 to be drawn forwardly away from the driver.

The control means 20 is permitted to be drawn forwardly away from the driver for one or more of the following reasons. When the collision occurs there will be a tendency for the control rods 46, 48 to be drawn forwardly simultaneously so that the toothed pinion 64 also tends to move forwardly and this causes the synchronising box 52 to tend move forwardly. This tendency causes the dash panel 16 and the bulk-head panel 18 to tend to be deformed forwardly and causes the easily fracturable bolts 84 to be fractured or sheared so as to enable the top plate 80 to move forwardly and permit the toothed pinion 64 to be rocked to move with the two control shafts 46 and/or the easily fracturable bolts 54 are fractured to enable the synchronising box 52 to move forwardly in a unit away from the bulk-head panel 18. As a result of the movement forwardly of the manually movable control means 20 relative to the vehicle injury to the driver as a result of the collision is avoided or lessened.

Instead of the synchronising box 52 being associated with the control shafts 46 and 48 said box may be associated with the steering rods 104 and 106 as indicated at 132 in FIG. 2, and in this case the synchronising box is mounted on the chassis 12.

Figure 6:
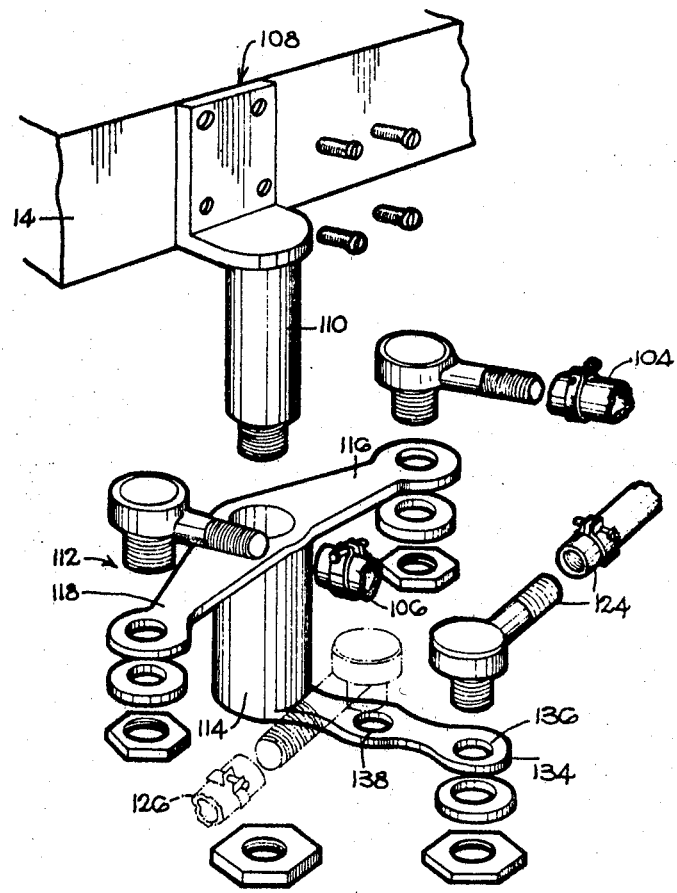
FIG. 6 is a similar view to FIG. 2 but showing an alternative form of relay cluster and FIG. 7 is a view similar to FIG. 1 but showing an alternative form of steering control.

Referring to FIG. 6 the relay cluster 112 differs only from the relay cluster shown in FIG. 2 insofar that instead of there being two lower arms 120 and 122 a single lower arm 134 is provided having two holes 136 and 138 enabling pivotal connections to be made to both the right-hand and left-hand tie rods 124 and 126 respectively.

Figure 7:
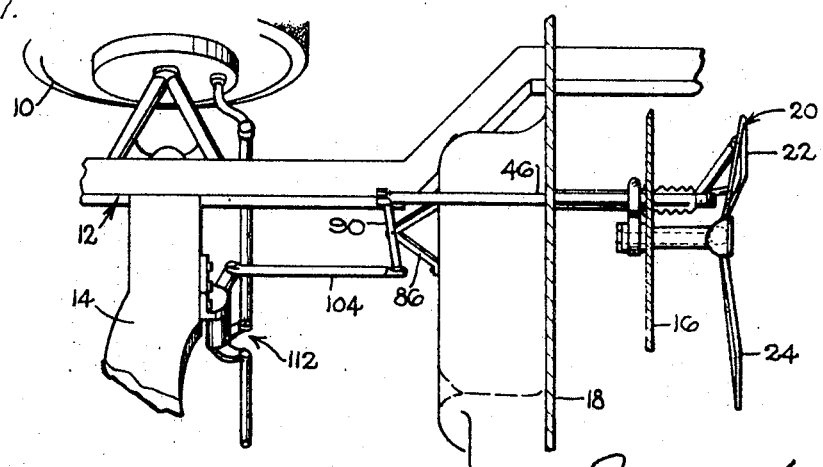

It should be appreciated that the steering control previously described with reference to the drawings affords a dual arrangement comprising two control shafts being the right-hand and left-hand control shafts 46 and 48 respectively and corresponding two rockable levers 90 and 92 and two steering rods 104 and 106 and instead of this dual arrangement there may be provided according to the present invention a single arrangement as illustrated in FIG. 7 in which only one control shaft such as 46 and one rockable lever 90 and one steering rod 104 are provided. The forward end of the steering rod 104 is connected to a relay cluster 112 and the rearward end of the control shaft 46 is connected to the right-hand member 22 of the control means 20 which may or may not be provided with the left-hand member 24. The control means 20 is pivotally mounted as more clearly illustrated in FIG. 5. As an alternative to the provision of the handlebar type of control means 20, a handle may be attached to the rearward end of the control shaft 46 so as to be rectilineally movable forwardly and rearwardly with the shaft and thus so as not to be rockably movable.

The invention thus provides a steering control for a motor vehicle and also provides a motor vehicle when fitted with the steering control whereby in the case of the front of the vehicle being involved in a collision the manually movable control means 20 is moved forwardly away from the driver so that the steering control affords a measure of safety for the driver which is not obtained with known steering controls.

What is claimed is:

1. A steering control for a motor vehicle comprising manually movable control means 20 for connection to a steerable road wheel or wheels 10 of the vehicle wherein the improvement comprises a reversing movement coupling 90, 92 operative in a direction forwardly and rearwardly of the vehicle and connected to the manually movable control means and to steering means 104, 106 connectable to the steerable road wheel or wheels of the vehicle whereby if the front of the vehicle is involved in a collision and the steering means is forced rearwardly of the vehicle, the manually movable control means is urged forwardly of the vehicle and thus away from the driver so that injury to the driver as a result of the collision is avoided or lessened.

2. A steering control according to claim 1 wherein the improvement comprises the reversing movement coupling in the form of a rockable lever 90 or 92 pivoted intermediate its ends 96, 100 or 98, 102 about a horizontal or substantially horizontal axis of a shaft 88 transversely of the vehicle and having an upper end 96, 98 connected to the manually movable control means 20 and having a lower end 100, 102 connected to the steering means 104, 106.

3. A motor vehicle having two front steerable road wheels 10 operatively connected to a steering control as claimed in claim 2.

4. A steering control according to claim 2 wherein the improvement comprises a stationary bearing 50 disposed longitudinally of the vehicle and slidably supporting the movable control means 20 which is movable forwardly and rearwardly relative to the vehicle and the steering means 104, 106 is movable rearwardly and forwardly respectively.

5. A steering control according to claim 4 wherein the improvement comprises the manually movable control means in the form of right-hand and left-hand members 22, 24 mounted on a member 28 to be simultaneously movable in opposite senses forwardly and rearwardly of the vehicle and connected to the reversing movement coupling 90, 92 which is also connected to the steering means having right-hand and left-hand members 104, 106 corresponding to said right-hand and left-hand members 22, 24 of the manually movable control means 20 so that said right-hand and left-hand steering members 104, 106 are movable simultaneously in opposite senses rearwardly and forwardly respectively in response to movement of the manually movable control means right-hand and left-hand members 22, 24.

6. A motor vehicle having two front steerable road wheels 10 operatively connected to a steering control as claimed in claim 5.

7. A steering control according to claim 5 wherein the improvement comprises right-hand control and steering members 22, 104 connected to a right-hand rockable lever 90 and the left-hand control 24, 106 and steering members are connected to a left-hand rockable lever 92.

8. A steering control according to claim 5 wherein the improvement comprises a synchronising means 60, 62, 64 connected between the right-hand and left-hand members 22, 24 to ensure simultaneous movement of the members.

9. A steering control according to claim 8 wherein the improvement comprises synchronising means in the form of toothed racks 60, 62 provided on the right-hand and left-hand members 46, 48, 104, 106 and meshing with a toothed pinion 64 on diametrally opposite sides thereof and said toothed pinion 64 is supported by bearings about a stationary axis relative to the vehicle.

10. A steering control according to claim 9 wherein the improvement comprises the synchronising means in the form of a box part 52 within and by which the toothed pinion 64 is supported and said box part 52 is secured to a stationary part 18 of the vehicle.

11. A steering control according to claim 10 wherein the improvement comprises the box part 52 secured to the stationary bulk-head 18 by easily fracturable securing means 54.

12. A steering control according to claim 11 wherein the improvement comprises the toothed pinion 64 supported by bearings 76 in a part 80 secured in position by easily fracturable securing means 84 to enable the toothed pinion 64 to become disengaged from the toothed racks 60, 62 when a collision occurs and permit the toothed racks to move simultaneously in the same sense.

13. A steering control according to claim 1 wherein the invention comprises the manually movable control means 20 in the form of right-hand and left-hand members 22, 24 connected rigidly together and pivotally mounted at 26, 28 centrally between the ends thereof.

14. A steering control according to claim 13 wherein the invention comprises the manually movable control means pivotally mounted by a ball joint.

15. A motor vehicle having two front steerable road wheels 10 operatively connected to a steering control as claimed in claim 1.

References Cited

UNITED STATES PATENTS

| | | | |
|---|---|---|---|
| 1,540,608 | 6/1925 | Dawson et al. | 74—494 |
| 1,567,603 | 12/1925 | King | 180—77 |
| 2,499,993 | 4/1950 | Gregg | 244—1 |
| 2,842,372 | 7/1958 | D'Antini. | |
| 3,056,564 | 10/1962 | Zuck | 244—2 |
| 3,198,541 | 8/1965 | Christenson et al. | 280—91 |

KENNETH H. BETTS, Primary Examiner

U.S. Cl. X.R.

74—491; 280—95